(12) United States Patent
Yoon

(10) Patent No.: US 9,852,600 B1
(45) Date of Patent: Dec. 26, 2017

(54) SAFETY MONITORING SYSTEM USING INTELLIGENT WALKING STICK

(71) Applicant: ION Co., Ltd., Busan (KR)

(72) Inventor: Jang-Won Yoon, Gyeongsangnam-do (KR)

(73) Assignee: ION CO., LTD., Busan (KR)

( * ) Notice: Subject to any disclaimer, the term of this patent is extended or adjusted under 35 U.S.C. 154(b) by 0 days.

(21) Appl. No.: 15/299,187

(22) Filed: Oct. 20, 2016

(51) Int. Cl.
| | |
|---|---|
| G08B 21/04 | (2006.01) |
| G08B 25/01 | (2006.01) |
| A63B 24/00 | (2006.01) |
| A63B 71/06 | (2006.01) |
| A63F 13/211 | (2014.01) |
| A63F 13/92 | (2014.01) |
| A61H 3/00 | (2006.01) |

(52) U.S. Cl.
CPC .......... *G08B 21/0461* (2013.01); *A61H 3/00* (2013.01); *A63B 24/0062* (2013.01); *A63B 71/0622* (2013.01); *A63F 13/211* (2014.09); *A63F 13/92* (2014.09); *G08B 21/0492* (2013.01); *G08B 25/016* (2013.01); *A63B 2220/12* (2013.01); *A63B 2220/17* (2013.01); *A63B 2220/18* (2013.01); *A63B 2220/34* (2013.01); *A63B 2220/40* (2013.01); *A63B 2220/56* (2013.01); *A63B 2220/803* (2013.01); *A63B 2220/833* (2013.01); *A63B 2230/06* (2013.01); *A63B 2230/75* (2013.01); *A63F 2300/105* (2013.01); *A63F 2300/1043* (2013.01)

(58) Field of Classification Search
None
See application file for complete search history.

(56) References Cited

U.S. PATENT DOCUMENTS

2004/0133081 A1* 7/2004 Teller ................. A61B 5/01
600/300
2016/0253890 A1* 9/2016 Rabinowitz ............ A61H 1/02

* cited by examiner

*Primary Examiner* — Leon-Viet Nguyen
(74) *Attorney, Agent, or Firm* — Muncy, Geissler, Olds & Lowe, P.C.

(57) ABSTRACT

Disclosed is a safety monitoring system using an intelligent walking stick, the system helps stabilize ambulation of a user, monitors safety and health of the user by monitoring the heart rate or a motion state of the user, and includes content providing mental stimulation and exercise to the user via an application.

9 Claims, 9 Drawing Sheets

SAFETY MONITORING SYSTEM USING INTELLIGENT WALKING STICK

BACKGROUND OF THE INVENTION

Field of the Invention

The present invention relates generally to a safety monitoring system using an intelligent walking stick. More particularly, the present invention relates to a safety monitoring system using an intelligent walking stick whereby the system helps stabilize ambulation of a user, monitors safety and health of the user by monitoring the heart rate or motion state of the user, and includes content stimulating a user's brain and improving flexibility of the user through an application.

Description of the Related Art

In modern society, mortality rates have remarkably decreased due to the development of medical science and since a high standard of living has become common. On the other hand, birth rates of developed countries, such as Korea, are decreasing every year.

According to the United Nations (UN), an aging society is one in which more than 7% but less than 14% of the population is over the age of 65, and a super-aging society is one in which more than 20% of the population is over the age of 65.

In 2001 Korea became an aging society when the proportion of the population of Korea aged 65 and older exceeded 7%. In the current year 2016, the proportion of the population aged 65 and older has reached 10.5%. It is expected that the proportion aged 65 and older will reach 21.5% by 2030, and Korea will become a super-aging society. The speed at which the population of Korea has become and is expected to continue to become more "aged" will encourage the development of industry related to elderly care and thus improve the quality of life of the elderly.

Meanwhile, as an item of technology related to a walking stick that helps to stabilize ambulation of the aged, Korea Patent No. 0860279 discloses a walking stick for the aged and a traffic light system, the system including: a power supply unit supplying DC power; a walking stick for the aged including an active radio frequency identification (RFID) device operated by receiving the DC power from the power supply unit, transmitting a wireless telecommunication signal, and storing a unique identification; and a control part including an RFID reader receiving the wireless telecommunication signal from the active RFID device and switching on and off a crossing signal or a stop signal of a traffic light by using the unique identification included in an output data of the RFID reader. When a user with the walking stick for the aged stops in front of a traffic light while walking, the control part detects the walking stick of the user, determines whether the user wants to cross or not, and controls the traffic light according to the determination.

However, a current walking stick for the elderly at most simply controls a signal of the traffic light when a user uses the traffic system such as to walk across the road at a pedestrian crossing or crosswalk, thus limiting where the walking stick's extra features may be used.

Also, the current walking stick does not have a function to monitor the safety and health of the user, and does not have a function to provide mental stimulation for the elderly to hinder or prevent development of dementia or to induce stretching to hinder or prevent the development of dementia and prevent falling in old people.

SUMMARY OF THE INVENTION

The present invention has been developed keeping in mind the above problems of the related art, and the present invention is intended as a proposed safety monitoring system using an intelligent walking stick that can be used in various places and is capable of monitoring safety and health of a user.

In addition, the present invention is intended to provide a safety monitoring system using an intelligent walking stick that provides mental stimulation to hinder or prevent development of dementia or induces the user to stretch so that his or her mobility can be maintained.

However, the objects of the present invention are not limited to the aforementioned objects, and those skilled in the art will be able to clearly discern other objects not specifically mentioned in the following description.

In order to achieve the above object, one aspect of the present invention is providing a safety monitoring system that uses an intelligent walking stick, the system includes: an intelligent walking stick including: a motion sensing part generating motion information by sensing a motion according to a change in slope, position, and angle of the intelligent walking stick; and a health sensing part generating health information by sensing a heart rate of a user; a main server including: an information receiving part receiving the motion information and the health information generated from the motion sensing part and the health sensing part of the intelligent walking stick; an emergency notification part determining if the user is in an emergency situation and notifying the emergency situation to a management terminal when the motion information and the health information are not sensed while in the process of receiving the motion information and the health information from the information receiving part; and a body information storing part calculating and storing body information, the body information including the heart rate, a number of paces, and a number of calories burned of the user, which are calculated using the motion information of the intelligent walking stick and the health information of the user transmitted from the information receiving part; and a user terminal including a motion interacting application, the motion interacting application including exercise content, game content, and health management content that all employ the motion information transmitted from the information receiving part or the body information transmitted from the body information storing part, the exercise content displaying the motion information on a screen of the user terminal by using the motion information as an exercise input signal when the exercise content is executed by a selection of the user, the game content displaying a specific image on the screen of the user terminal and moving the specific image by using the motion information as a game input signal when the game content is executed by a selection of the user, and the health management content always being forcibly executed and displaying the body information on one end of the screen of the user terminal.

In addition, the intelligent walking stick may further include a global positioning system (GPS) part installed therein and sensing current positional information of the intelligent walking stick, wherein the motion sensing part includes an acceleration sensor module measuring acceleration information and slope information of the intelligent walking stick, and an angular velocity sensor module measuring angular velocity information of the intelligent walking stick, and the health sensing part includes a heart rate sensor module measuring the heart rate of the user and a pressure sensor module measuring pressure information generated whenever a lower end of the intelligent walking stick comes into contact with a ground.

In addition, the motion interacting application may further include: a motion information receiving part that receives the acceleration information, the slope information, and the angular velocity information of the intelligent walking stick transmitted from the receiving part of the main server; a signal converting part that converts the acceleration information, the slope information, and the angular velocity information of the intelligent walking stick transmitted from the motion information receiving part to the exercise input signal and the game input signal; and an executing part that executes the game content or the exercise content by using the converted input signals of the signal converting part.

In addition, the game content may further include first gaming sub-content that implements: a first moving image that is displayed on the screen of the user terminal and moves on the screen according to the acceleration information, the slope information, and the angular velocity information of the intelligent walking stick transmitted to the signal converting part; and an obstacle image that is periodically displayed on the screen at a location near the first moving image for a predetermined time, and temporarily pauses a movement of the first moving image when the obstacle image comes into contact with the first moving image.

In addition, the game content may further include second gaming sub-content that implements: a second moving image that is displayed on the screen of the user terminal and moves on the screen according to the acceleration information, the slope information, and the angular velocity information of the intelligent walking stick transmitted to the signal converting part; and a target image that is displayed on the screen at a location spaced apart from the second moving image, the target image being made to appear at one end of the screen and displayed on the screen for a predetermined time and being made to disappear at the other end of the screen, and also being made to disappear when contacting the second moving image and then being made to re-appear at another position of the screen.

In addition, the main server may further include a motion state database that stores the motion information including the acceleration information, the slope information, and the angular velocity information of the intelligent walking stick transmitted to the information receiving part, and a health state database that stores the health information including the heart rate of the user and the pressure information transmitted to the information receiving part, wherein the emergency notification part generates a first emergency signal when the motion information exceeds a predetermined motion reference range, generates a second emergency signal when the health information exceeds a predetermined health reference range, and transmits the first emergency signal or the second emergency signal together with the positional information sensed by the GPS part to the management terminal after a predetermined waiting time has elapsed from when the first emergency signal or the second emergency signal is generated.

In addition, the intelligent walking stick may further include an emergency button that generates a third emergency signal when the emergency button is pressed, and transmits the third emergency signal and the positional information sensed by the GPS part to the main server after a predetermined waiting time has elapsed from when the third emergency signal is generated.

In addition, the intelligent walking stick may further include a safety confirmation button that generates a safety confirmation signal when the safety confirmation button is pressed within the predetermined waiting time, and stops generating the first emergency signal or the second emergency signal generated from the emergency notification part and stops the generation of the third emergency signal generated from the emergency button.

As a means for solving the above-described problem, in the safety monitoring system using the intelligent walking stick of the present invention, the emergency notification part of the main server determines whether an emergency situation involving the user has occurred by using the motion information and the health information generated from the motion sensing part and the health sensing part that are installed in the intelligent walking stick, and notifies the emergency situation to a management terminal, and thus the intelligent walking stick can monitor safety in real time in various places.

In addition, the safety monitoring system using the intelligent walking stick of the present invention monitors in real time and anywhere the health of the user by calculating a heart rate, a number of paces, and a number of calories burned of the user based on the health information generated from the health sensing part of the intelligent walking stick.

Also, in the safety monitoring system using the intelligent walking stick of the present invention, the game content of the motion interacting application installed in the user terminal is implemented according to the motion information of the intelligent walking stick, and thus having an effect that the development of dementia in the user may be hindered or prevented by mental stimulation through use of the game content.

Further, in the safety monitoring system using the intelligent walking stick of the present invention, the exercise content of the motion interacting application installed in the user terminal is implemented according to the motion information of the intelligent walking stick, thus having an effect that body flexibility of the user may be improved through use of the exercise content, and thereby improving mobility.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinafter, preferred embodiments of the present invention will be described in detail with reference to the accompanying drawings. Characteristics, effects, and advantages that the ordinarily skilled in the art can easily appreciate will be simply described, illustrated or omitted, and the following description or illustration will focus on parts that closely relate to the present invention.

Figure 1:
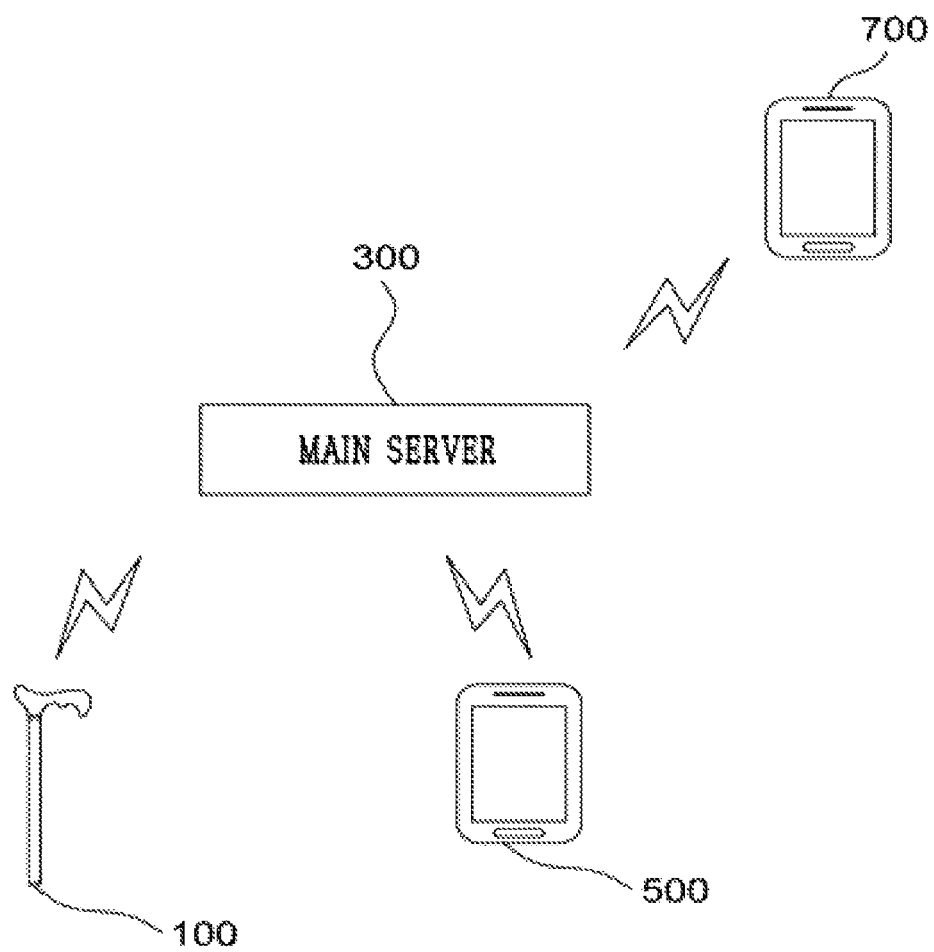
FIG. 1 is a configuration view schematically showing a safety monitoring system using an intelligent walking stick according to the present invention.

FIG. 1 is a configuration view schematically showing a safety monitoring system using an intelligent walking stick according to the present invention.

Referring to FIG. 1, a user essentially brings with them the present invention while being out, and the present invention helps stabilize ambulation of the user. The present invention includes an intelligent walking stick 100 that is capable of sensing changes in slope, direction, angle, etc. of the intelligent walking stick 100 and sensing a heart rate of the user; a main server 300 that receives motion information and the heart rate sensed by the intelligent walking stick 100, determines an emergency situation of the user, and notifies the emergency situation to a management terminal 700; and a user terminal 500 that receives the motion information of the intelligent walking stick 100 and heart rate of the user from the main server 300.

Figure 2:
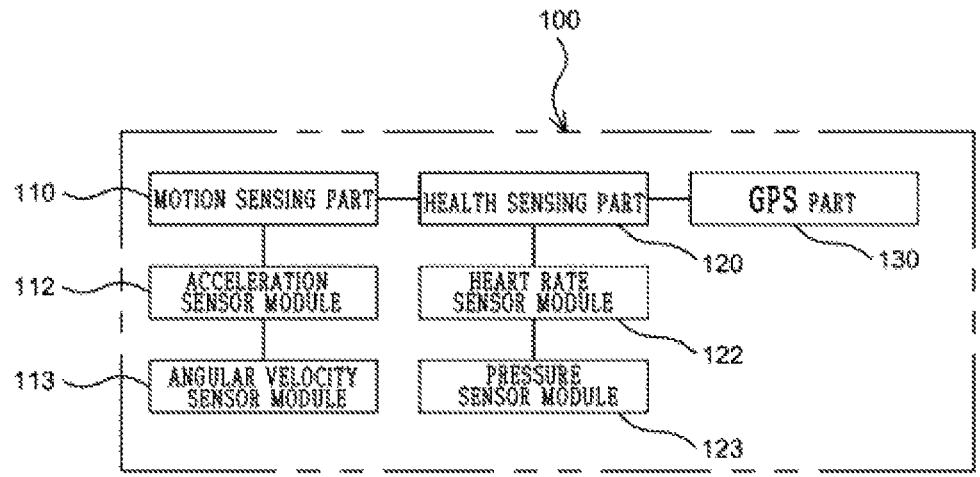
FIG. 2 is a block diagram showing an intelligent walking stick of a safety monitoring system using an intelligent walking stick according to an embodiment of the present invention.

FIG. 2 is a block diagram showing an intelligent walking stick of a safety monitoring system using an intelligent walking stick according to an embodiment of the present invention.

Referring to FIG. 2, the intelligent walking stick 100 of the present invention includes a motion sensing part 110 and a health sensing part 120.

The motion sensing part 110 generates motion information by sensing a motion according to changes in slope, direction, and angle of the intelligent walking stick 100. In detail, the motion sensing part 110 includes an acceleration sensor module 112 that measures acceleration and slope information of the intelligent walking stick 100 and an angular velocity sensor module 113 that measures angular velocity information of the intelligent walking stick 100.

The acceleration sensor module 112 may sense a slope of the intelligent walking stick 100 by measuring force along three axes (x, y, z axes) of the intelligent walking stick 100 based on an acceleration of gravity. The angular velocity sensor module 113 may sense an angle change of the intelligent walking stick 100 for each axis for a predetermined time.

In other words, the motion sensing part 110 generates motion information such as slope, slope change, direction of the intelligent walking stick 100 by using the acceleration and slope information measured by the acceleration sensor module 112. In addition, a user's state may be easily determined by generating the motion information regarding changes in rotation, direction, and angle of the intelligent walking stick 100 by using the angular velocity information measured by the angular velocity sensor module 113.

For example, when a slope of the intelligent walking stick has significantly changed, it may be speculated that a user's posture is also significantly inclined as the user walks with the intelligent walking stick. Similarly, it may determine when the user has fallen while walking.

Changes in acceleration information, slope information, and angular velocity information as measured by the acceleration sensor module 112 and the angular velocity sensor module 113 are used to determine a posture, slope, etc. of the intelligent walking stick 100. Thus, it is preferable to install the motion sensing part 110 in a handle (not shown) of the intelligent walking stick 100 so that the user's state may be accurately determined.

The health sensing part 120 generates heath information by sensing the heart rate of the user. In detail, the health sensing part 120 includes a heart rate sensor module 122 that measures heart rate information of the user and a pressure sensor module 123 that measures pressure information generated whenever a lower end of the intelligent walking stick 100 comes into contact with the ground while walking.

Herein, the heart rate sensor module 122 may be installed in the entire inside part of the handle of the intelligent walking stick 100 such that a heart rate of the entire palm that is grasping the intelligent walking stick 100 is measured. However, it may cause inconvenience to the user since the user must continuously grasp the handle for the heart rate to be consistently measured. In addition, having to install the heart rate sensor module 122 in the entire inside part of the handle of the intelligent walking stick 100 increases the material cost for measuring the heart rate.

Therefore, it is preferable to install the heart rate sensor module 122 in a predetermined end of the handle so that the heart rate sensor module 122 senses the heart rate in a thumb of the user grasping the intelligent walking stick 100.

The heart rate sensor module 122 continuously checks changes in the heart rate information of the user using the intelligent walking stick 100, thus having an effect of checking the health state of the user.

Next, it is preferable to install the pressure sensor module 123 in a lower end of a body (not shown) of the intelligent walking stick 100 extending from the handle, such that the pressure information is precisely measured when the intelligent walking stick 100 comes into contact with the ground.

The intelligent walking stick 100 may further include a global positioning system (GPS) part 130 to sense current positional information of the intelligent walking stick 100.

The current positional information of the intelligent walking stick 100 may be sensed by using the GPS part 130, thus having an effect of easily determining the current positional information of the user.

Meanwhile, the handle of the intelligent walking stick 100 may further include a power part (not shown), a speaker (not shown) outputting a sound, an LED device (not shown) outputting light, a charging circuit, and a battery such that the intelligent walking stick 100 is charged by using external power. Alternatively, the handle of the intelligent walking stick 100 may further include a charging part (not shown) such that the intelligent walking stick 100 may be used by replacing a depleted battery with a new one.

Figure 3:
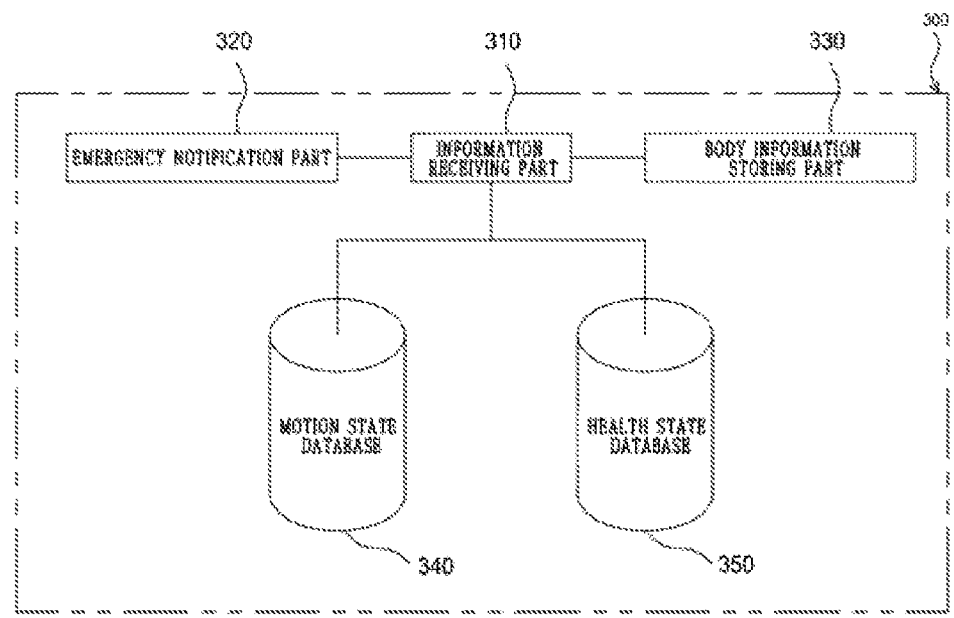
FIG. 3 is a block diagram of a main server of the safety monitoring system using the intelligent walking stick according to the present invention.

FIG. 3 is a block diagram of a main server of the safety monitoring system using the intelligent walking stick according to the present invention.

Referring to FIG. 3, the main server 300 includes an information receiving part 310, an emergency notification part 320, and a body information storing part 330.

The information receiving part 310 receives the motion information and the health information that are generated from the motion sensing part 110 and the health sensing part 120 of the intelligent walking stick 100.

The emergency notification part 320 determines if the user is in an emergency situation and notifies the emergency situation to a management terminal 700 when the motion information and the health information are not sensed while in the process of receiving the motion information and the health information from the information receiving part 310.

Herein, the motion information and the health information of the user may not be sensed when an emergency situation such as a fall has occurred, or when the user just drops the intelligent walking stick 100 causing the intelligent walking stick 100 to be separated from the user.

The body information storing part 330 calculates and stores body information, the body information includes the heart rate, a number of paces, and a number of calories burned of the user and is calculated by using the motion information of the intelligent walking stick 100 and the health information of the user that are transmitted from the information receiving part 310.

Herein, the number of paces of the user may be calculated by sensing pressure generated whenever the user sets the walking stick 100 down onto the ground in the process of walking with the pressure sensor module 123 of the health sensing part 120. The number of calories burned by the user may be calculated based on the calculated number of paces of the user.

In addition, a user's motion may be predicted by sensing changes in acceleration information, slope information, and angular velocity information through the motion sensing part 110 of the intelligent walking stick 100. Also, the number of calories burned by the user may be calculated based on the user's motion and the number of paces of the user.

The main server 300 further includes a motion state database 340 that stores the motion information including information on acceleration, slope, and angular velocity of the intelligent walking stick 100 that are transmitted to the information receiving part 310, and a health state database 350 that stores the health information including the heart rate information of the user and pressure information that are transmitted to the information receiving part 310.

In detail, the emergency notification part 320 generates a first emergency signal when the motion information exceeds a predetermined motion reference range, generates a second emergency signal when the health information exceeds a predetermined health reference range, and transmits the first emergency signal or the second emergency signal together with the positional information of the intelligent walking stick 100 sensed by the GPS part 130 to the management terminal 700 after a predetermined waiting time has elapsed from when the first emergency signal or the second emergency signal is generated.

For example, the first emergency signal may be generated when an emergency situation such as when the user falls, or when the user merely drops the intelligent walking stick 100 causing the intelligent walking stick 100 to be separated from the user. Alternatively, the first emergency signal may be generated when a user's posture has significantly changed and the intelligent walking stick 100 has not been dropped. Herein follows that the motion information of the intelligent walking stick 100 has also significantly changed.

The second emergency signal may be generated when the intelligent walking stick 100 is separated from the user so that the heart rate of the user is not sensed, or, when the user has a heart attack, and thus, the heart rate information of the user is significantly changed.

However, causes of the emergency signal are not limited to the first emergency signal and the second emergency signal described in the present invention.

The aforementioned predetermined waiting time refers to a time that is used by the emergency notification part 320 to finally determine the emergency situation of the user after the first emergency signal or the second emergency signal has been generated. The waiting time may be between 5 and 10 seconds as is appropriate to determine the emergency situation. The waiting time may be altered through the user terminal 500.

Figure 4:
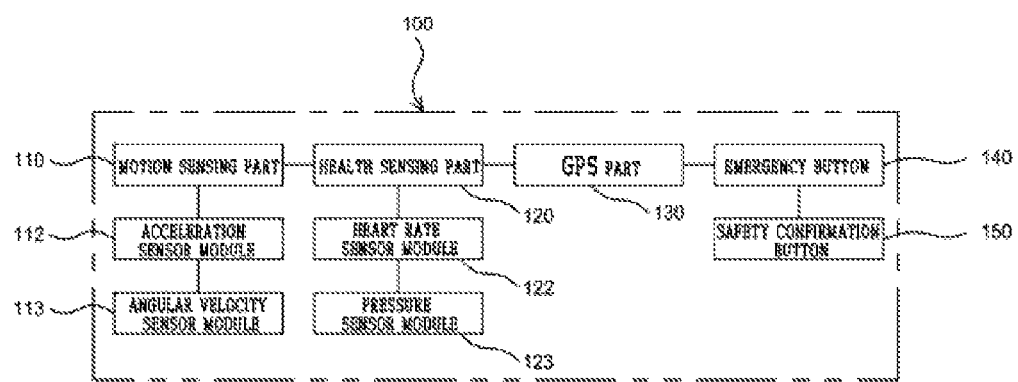
FIG. 4 is a block diagram showing an intelligent walking stick of a safety monitoring system using an intelligent walking stick according to another embodiment of the present invention.

FIG. 4 is a block diagram showing an intelligent walking stick of a safety monitoring system using an intelligent walking stick according to another embodiment of the present invention.

Referring to FIG. 4, the intelligent walking stick 100 may further include an emergency button 140 and a safety confirmation button 150.

The emergency button 140 generates a third emergency signal when the emergency button 140 is pressed by the user, and transmits the third emergency signal and the positional information of the intelligent walking stick 100 sensed by the GPS part 130 to the main server 300 after a predetermined waiting time has elapsed from when the third emergency signal is generated.

The emergency notification part 320 may generate the first emergency signal or the second emergency signal by using the motion information or the health information respectively, and then notify the emergency situation of the user to the management terminal 700. Alternatively, the user may directly notify the emergency situation to the management terminal 700 by pressing the emergency button 140.

The safety confirmation button 150 generates a safety confirmation signal when the safety confirmation button 150 is pressed by the user within a predetermined waiting time, and stops generating the first emergency signal or the second emergency signal generated from the emergency notification part 320 and the third emergency signal generated from the emergency button 140. In other words, although the user might have fallen, the first emergency signal, the second emergency signal, or the third emergency signal may not be transmitted to the management terminal 700 due to the triggering of the safety confirmation signal by pressing the safety confirmation button 150.

Next, a safety monitoring system using an intelligent walking stick according to the present invention is described in detail with reference to a first, second, and third embodiments.

Figure 5:
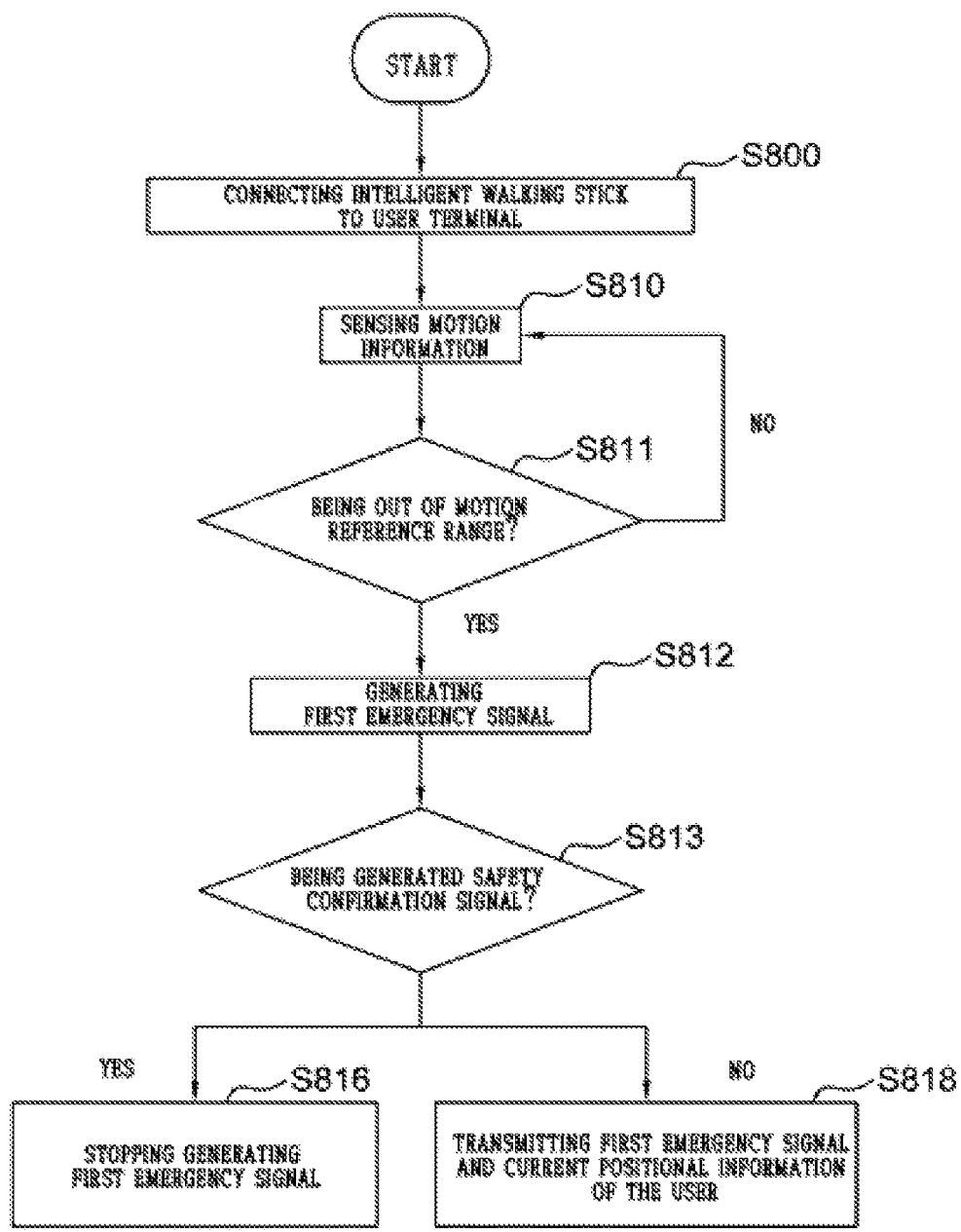
FIG. 5 is a flow chart showing a process of determining an emergency situation by using a safety monitoring system using an intelligent walking stick according to a first embodiment of the present invention.

FIG. 5 is a flow chart showing a process of determining an emergency situation by using a safety monitoring system using an intelligent walking stick according to a first embodiment of the present invention.

Referring to FIG. 5, according to the first embodiment of the present invention, the intelligent walking stick 100 is connected to the user terminal 500 through near field communication (for example, Bluetooth) (S800). The acceleration sensor module 112 and the angular velocity sensor module 113 continuously sense motion information including changes in slope, direction, and angle of the intelligent walking stick 100 (S810).

The emergency notification part 320 determines whether the motion information of the intelligent walking stick 100 exceeds a motion reference range or not (S811) and generates a first emergency signal when the motion information exceeds the motion reference range (S812). Herein, the first emergency signal is also generated when the emergency notification part 320 does not sense the motion information.

Herein, when a safety confirmation signal is generated from the safety confirmation button within a predetermined waiting time after the first emergency signal has been generated, the emergency notification part 320 determines that an emergency situation has not occurred (S813) and stops generating the first emergency signal (S816).

Alternatively, after the predetermined waiting time has elapsed from when the first emergency signal is generated, the emergency notification part 320 determines that an emergency situation has occurred (S813) and transmits the first emergency signal and the current positional information of the intelligent walking stick 100 sensed by the GPS part 130 to the management terminal 700 (S818).

In addition, the emergency notification part 320 may transmit the first emergency signal and the current positional information of the intelligent walking stick 100, and at the same time respectively output a warning alarm and warning light through the speaker and the LED device installed in the intelligent walking stick 100.

Figure 6:
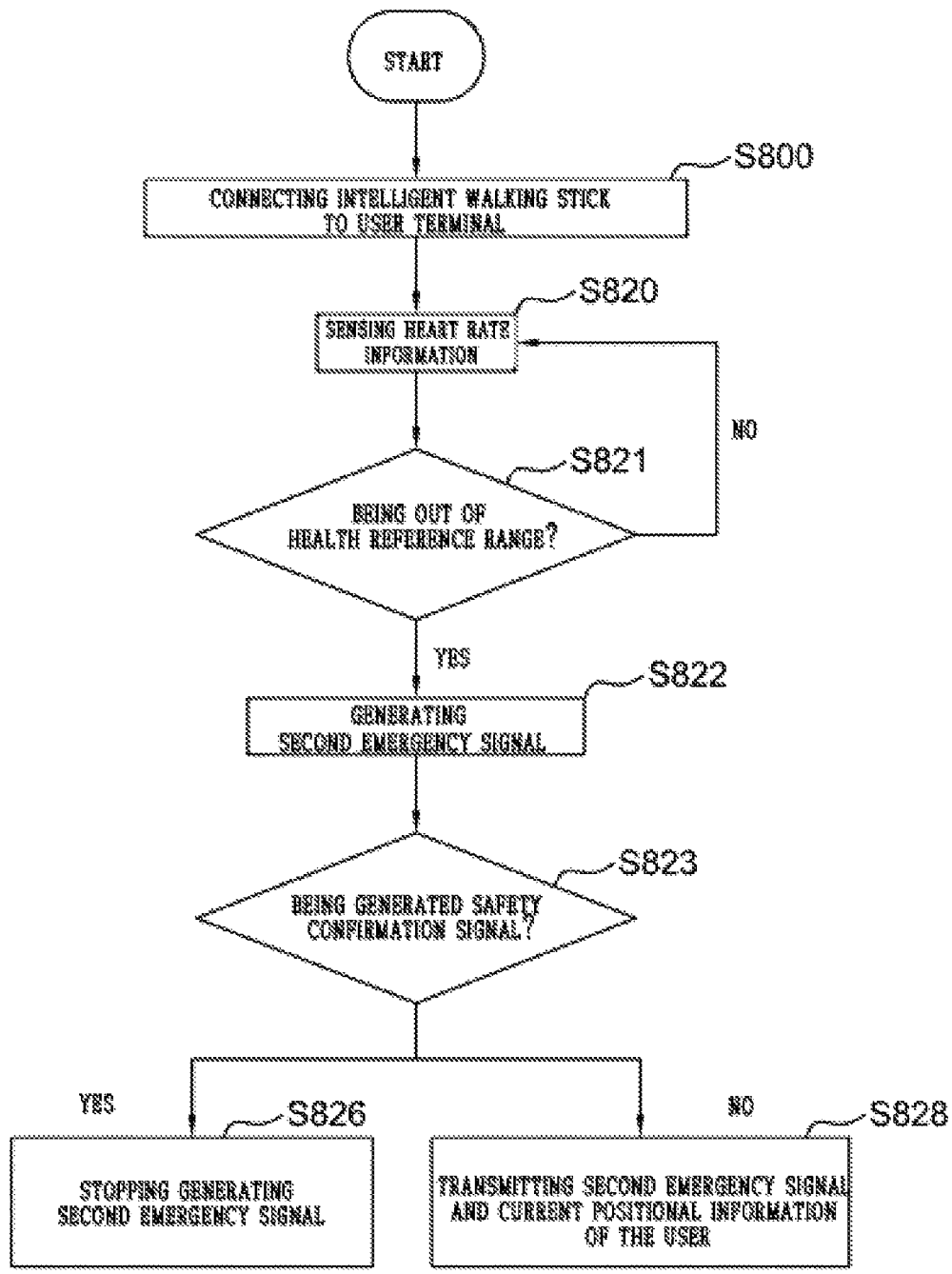
FIG. 6 is a flow chart showing a process of determining an emergency situation by using a safety monitoring system using an intelligent walking stick according to a second embodiment of the present invention.

FIG. 6 is a flow chart showing a process of determining an emergency situation by using a safety monitoring system using an intelligent walking stick according to a second embodiment of the present invention.

Referring to FIG. 6, according to the second embodiment of the present invention, the intelligent walking stick 100 is connected to the user terminal 500 through near field communication (for example, Bluetooth) (S800). The heart rate sensor module 122 continuously senses heart rate information through the hand of the user (S820).

The emergency notification part 320 determines whether the heart rate information of the user exceeds a health reference range or not (S821) and generates a second emergency signal when the heart rate information exceeds the health reference range (S822). Herein, the second emergency signal is also generated when the emergency notification part 320 does not sense the heart rate information.

Herein, when a safety confirmation signal is generated from the safety confirmation button by the user within a predetermined waiting time after the second emergency signal has been generated, the emergency notification part 320 determines that an emergency situation has not occurred (S823) and stops generating the second emergency signal (S826).

Alternatively, after the predetermined waiting time has elapsed from when the second emergency signal is generated, the emergency notification part 320 determines that an emergency situation has occurred (S823) and transmits the second emergency signal and the current positional information of the intelligent walking stick 100 sensed by the GPS part 130 to the management terminal 700 (S828).

In addition, the emergency notification part 320 may transmit the second emergency signal and the current positional information of the intelligent walking stick 100, and at the same time respectively output a warning alarm and warning light through the speaker and the LED device installed in the intelligent walking stick 100.

Figure 7:
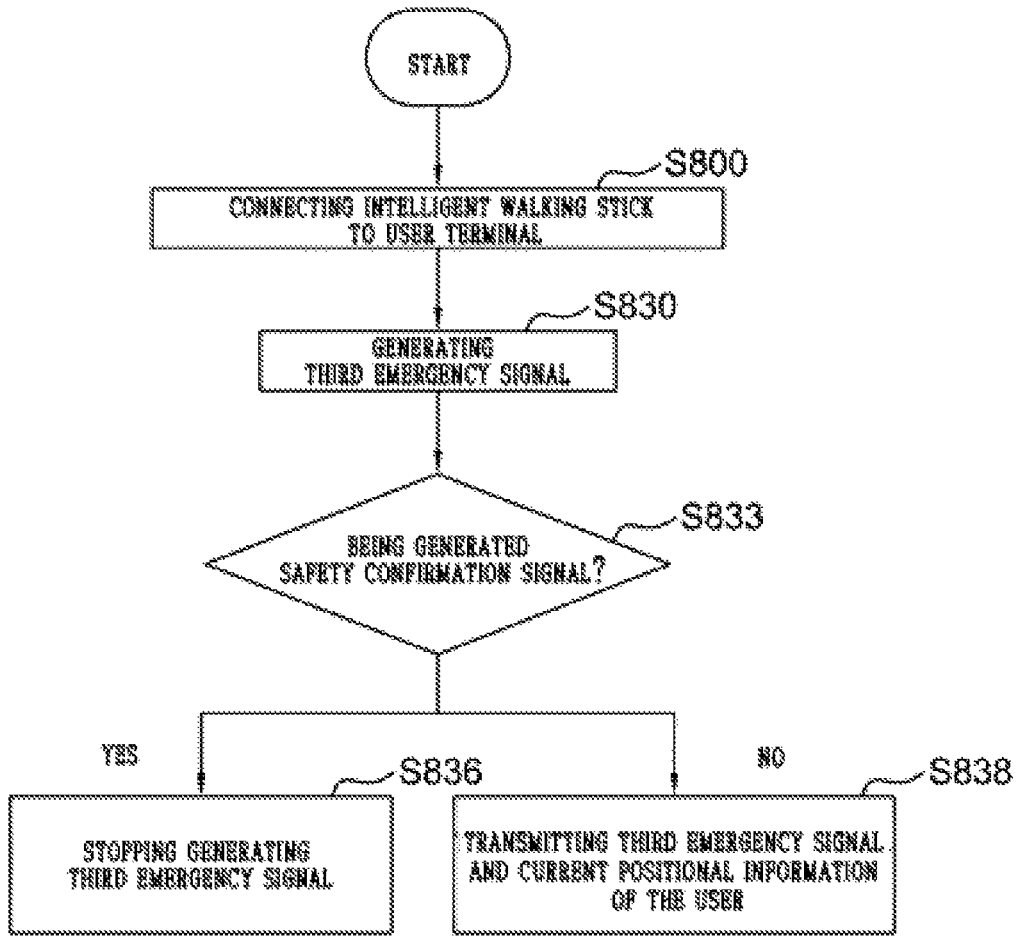
FIG. 7 is a flow chart showing a process of determining an emergency situation by using a safety monitoring system using an intelligent walking stick according to a third embodiment of the present invention.

FIG. 7 is a flow chart showing a process of determining an emergency situation by using a safety monitoring system using an intelligent walking stick according to a third embodiment of the present invention.

Referring to FIG. 7, according to the third embodiment of the present invention, the intelligent walking stick 100 is connected to the user terminal 500 through near field communication (for example, Bluetooth) (S800).

A third emergency signal is generated from the emergency button 140 (S830). When a safety confirmation signal is generated from the safety confirmation button 150 within a predetermined waiting time after the third emergency signal has been generated, the emergency notification part 320 determines that an emergency situation has not occurred (S833) and stops generating the third emergency signal (S836).

Alternatively, after the predetermined waiting time has elapsed from when the third emergency signal is generated, the emergency notification part 320 determines that an emergency situation has occurred (S833) and transmits the third emergency signal and the current positional information of the intelligent walking stick 100 sensed by the GPS part 130 to the management terminal 700 (S838).

In addition, the emergency notification part 320 may transmit the third emergency signal and the current positional information of the intelligent walking stick 100, and at the same time respectively output a warning alarm and warning light through the speaker and the LED device installed in the intelligent walking stick 100.

Figure 8:
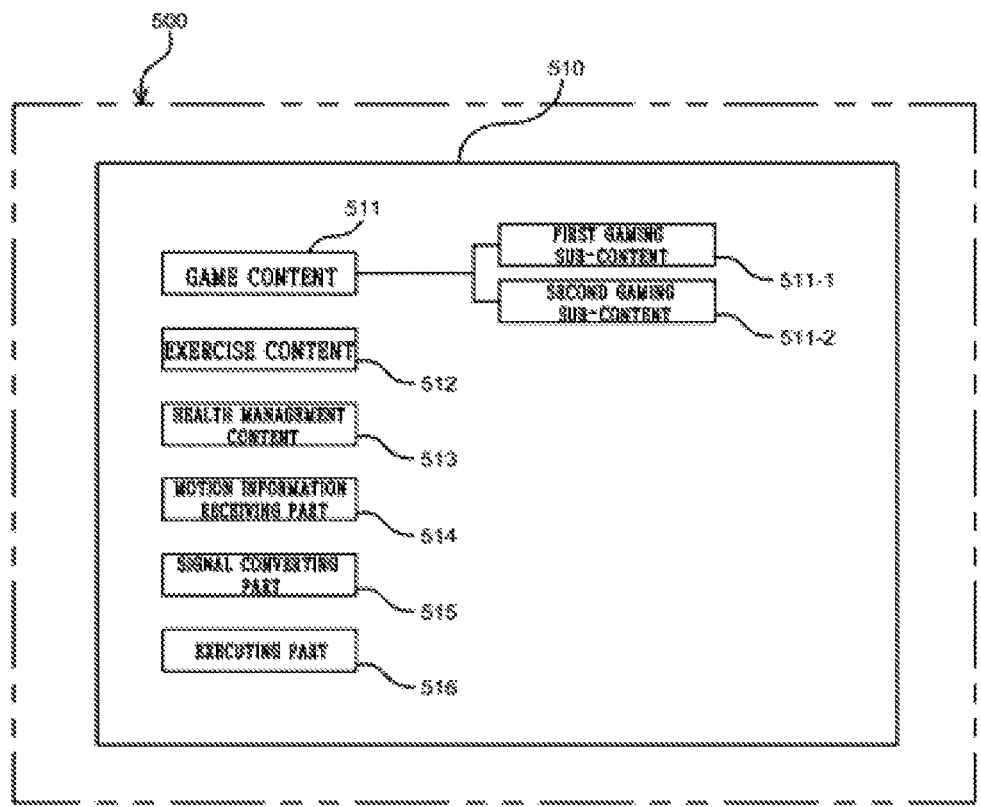
FIG. 8 is a block diagram of a user terminal of the safety monitoring system using the intelligent walking stick according to the present invention.
Figure 9:
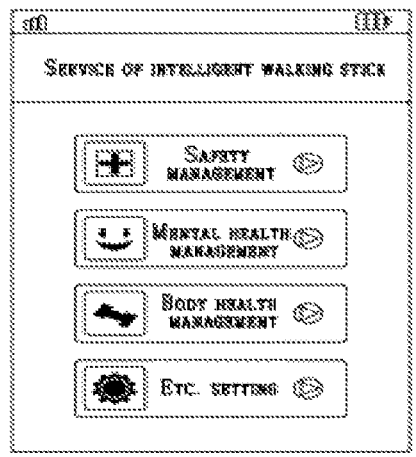
FIG. 9 is an example view of a starting screen of a motion interacting application being executed in the user terminal according to the present invention.

FIG. 8 is a block diagram of a user terminal of the safety monitoring system using the intelligent walking stick according to the present invention, and FIG. 9 is an example view of a starting screen of a motion interacting application being executed in the user terminal according to the present invention.

Referring to FIG. 8, the user terminal 500 includes a motion interacting application 510.

The motion interacting application 510 includes an exercise content 512, a game content 511, and a health management content 513 that all employ the motion information transmitted from the information receiving part 310 or the body information transmitted from the body information storing part 330.

Herein, the exercise content 512 displays the motion information on a screen of the user terminal 500 by using the motion information as an exercise input signal when the exercise content 512 is executed by a selection of the user. The game content 511 displays a specific image on the screen of the user terminal 500 and moves the specific image by using the motion information as a game input signal when the game content 511 is executed by a selection of the user. The health management content 513 is always forcibly executed and displays the body information on one end of the screen of the user terminal.

Herein, the game content 511 and the exercise content 512 are used to provide mental stimulation for the user and to induce him or her to perform flexibility exercises, so that dementia or an emergency situation such as falling of the user may be prevented. The game content 511 and the exercise content 512 will be described later in detail with reference to FIGS. 10 to 12.

In addition, the body information displayed on the screen of the user terminal 500 as the health management content 513 may include the heart rate of the user that is continuously sensed by the heart rate sensor module 122, the number of paces taken by the user that is calculated by counting the pressure information being generated whenever the user walks, the number of calories burned by the user that is calculated according to the number of paces taken by the user for a predetermined time, etc.

It is preferable to display the body information of the health management content 513 on the screen of the user terminal 500 all the time, even when the game content 511 or the exercise content are being executed, such that the body information of the user may be checked at any time.

Referring to FIG. 9, a starting screen of the motion interacting application is displayed on the screen of the user terminal. The game content and the exercise content may be displayed on a tab named as "Body health management", and the health management content may be displayed on a tab named as "Safety management".

Herein, a configuration of the start screen and names of the tabs shown in FIG. 9, however, possible configurations are not limited thereto, as various names and images may be used for content corresponding to the motion interacting application of the present invention.

The motion interacting application may further include guardian registration content (not shown). The guardian registration content is used for registering the management terminal to the user terminal and may be displayed on a tab named as "Etc. setting".

For example, when the "Etc. setting" tab is selected on the screen of the user terminal after executing the motion interacting application, the screen then displays option items for the registration of the management terminal. When a quick response (QR) code option is selected, then, a QR code is displayed on the screen of the user terminal.

Herein, the motion interacting application is also installed in the management terminal, and an "Etc. setting" tab is also selected on a staring screen of the management terminal as with the user terminal. When a QR code option is selected from the option items, then a built-in camera of the management terminal is executed to scan the QR code displayed on the screen of the user terminal.

The QR code displayed on the screen of the user terminal is scanned by the camera of the management terminal, and then the management terminal that has scanned the QR code is registered to the user terminal and may be notified of the emergency situation of the user from the main server.

A plurality of management terminals may be registered to the user terminal by using such method. The registered management terminal may be continuously notified of the emergency situation status of the user from the main server. The user terminal may manage the management terminal by changing or removing the registered management terminal.

A terminal of the guardian and not a terminal of an unauthorized person, may be registered as the management terminal, thus the notification of the current positional information of the user terminal to terminals of strangers may be prevented.

Herein, registering the management terminal by using the QR code is an embodiment of the present invention, however, the present invention is not limited thereto as various methods may be used to register the management terminal to the user terminal.

In addition, referring to FIG. 8, the motion interacting application 510 further includes a motion information receiving part 514, a signal converting part 515, and an executing part 516.

The motion information receiving part 514 receives the acceleration information, slope information, and angular velocity information of the intelligent walking stick 100 that are transmitted from the information receiving part 310. In other words, the motion information receiving part 514 may only receive the motion information of the information receiving part 310 that receives the motion information of the intelligent walking stick 100 and the health information of the user. The acceleration information, slope information, and angular velocity information of the intelligent walking stick 100 are used for the motion interacting application 510.

The signal converting part 515 converts the acceleration information, slope information, and angular velocity information of the intelligent walking stick 100 transmitted from the motion information receiving part 514 to exercise input signals and game input signals. Herein, the input signals may differ according to the game content 511 and the exercise content 512, thus the signal converting part 515 may convert to different input signals according to the game content 511 and the exercise content 512.

The executing part 516 executes the game content 511 and the exercise content 512 by using the input signals converted by the signal converting part 515. In other words, the input signals converted by the signal converting part 515 are used for the game content 511 and the exercise content 512, so that the game content 511 and the exercise content 512 may be executed according to the motion information of the intelligent walking stick 100.

Figure 10:
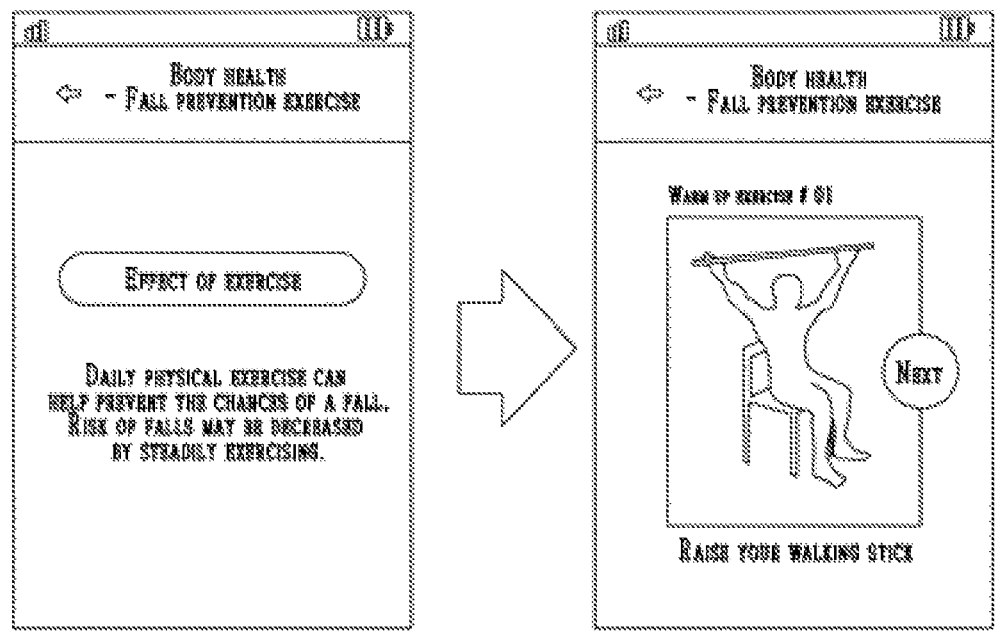
FIG. 10 is an example view of a screen in which exercise content of the motion interacting application is executed in the user terminal according to the present invention.

FIG. 10 is an example view of a screen in which exercise content of the motion interacting application is executed in the user terminal according to the present invention Referring to FIG. 10, shown is a state of the exercise content displayed on the screen of the user terminal capable of improving the flexibility of the user using an intelligent walking stick.

The "Body health management" tab is selected on the start screen of the motion interacting application, and then any one of a plurality of exercises listed on an options screen is selected. Then, exercise content corresponding to the selected exercise is executed and the screen changes to show an effect of the selected exercise.

Herein, when the exercise content is executed, a user image having a human figure appears on the screen, and the user image is implemented according to the acceleration information, the slope information, and the angular velocity information of the intelligent walking stick. When the intelligent walking stick is moved or turned right, left, up, down, or in any one direction, then the user image displayed on the screen of the user terminal also moves or turns to the right, left, up, down, or in the any one direction in response to the intelligent walking stick.

Since the acceleration information, slope information, and angular velocity information of the intelligent walking stick are generated by the acceleration sensor module and the angular velocity sensor module, it is preferable to move a position, direction, and angle of a part of the intelligent walking stick, and not to move the entire intelligent walking stick.

For example, assuming that the acceleration sensor module and the angular velocity sensor module are installed in the handle of the intelligent walking stick, and if the user moves the handle of the intelligent walking stick upward, then the acceleration sensor module and the angular velocity sensor module sense a direction change of the intelligent walking stick and generate the motion information. The motion information is transmitted to the motion information receiving part of the motion interacting application via the information receiving part of the main server. After, the motion information is converted to the input signal of the exercise content by the signal converting part, the user image moves upward in the same direction as the intelligent walking stick, according to the converted input signal.

The movement of the user image is not limited thereto, as the user image may move in a direction of right, left, or down on the screen of the user terminal as sensed by the acceleration sensor module. The user image may also move on the screen of the user terminal according to a rotation direction and angle of the handle of the intelligent walking stick as sensed by the angular velocity sensor module.

Thus, exercises capable of improving the flexibility of the user may be provided by using the exercise content, and, it may be confirmed whether the user is exercising adequately or not by sensing the motion of the intelligent walking stick. Therefore, the user may be able to keep physically fit enough to be able react to and avoid a fall or slip, etc.

Figure 11:
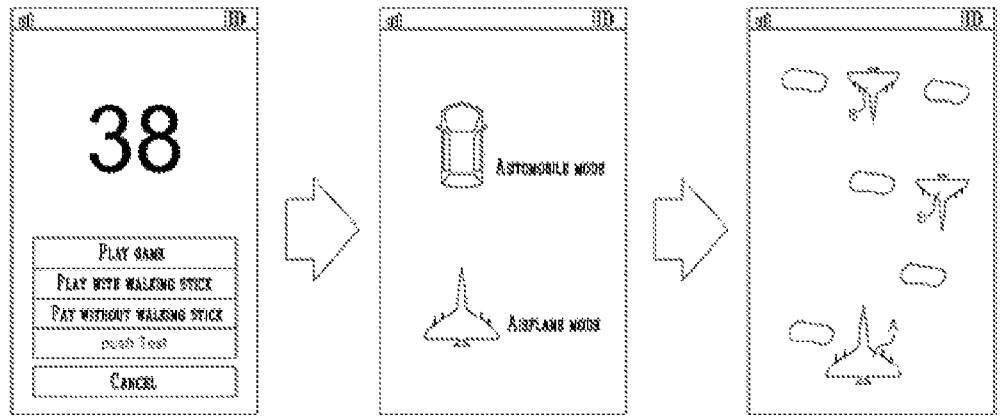
FIG. 11 is an example view of a screen in which game content of a motion interacting application is implemented in the user terminal according to an embodiment of the present invention.

FIG. 11 is an example view of a screen in which game content of a motion interacting application is implemented in the user terminal according to an embodiment of the present invention.

The game content 511 according to the embodiment of the present invention further includes a first gaming sub-content 511-1 as shown in FIG. 8, and is described as follows.

The first gaming sub-content 511-1 implements a first moving image A that is displayed on the screen of the user terminal and moves on the screen according to the acceleration information, the slope information, and the angular velocity information of the intelligent walking stick transmitted to the signal converting part, and an obstacle image B that is periodically displayed on the screen at a location near the first moving image A for a predetermined time, and temporarily pauses a movement of the first moving image A when the obstacle image B contacts the first moving image A.

Herein, the game content also includes game content that does not use the intelligent walking stick. However, in the present disclosure, the game content using the intelligent walking stick is described.

Referring to FIG. 11, the "Body health management" tab is selected on the start screen of the motion interacting application, then a game using the walking stick is selected on the options screen. Then, the first gaming sub-content, that implements the first moving image A and the obstacle image B, is executed.

Herein, when the first moving image A appears on the screen of the user terminal, then, at least one obstacle image B appears on the screen facing the first moving image A. Alternatively, the first moving image A and the obstacle image B may simultaneously appear on the screen.

When the first gaming sub-content is executed, the first moving image A moves on the screen of the user terminal according to the acceleration information, the slope information, and the angular velocity information of the intelligent walking stick. Thus, when the intelligent walking stick is moved or turned right, left, up, down or in any one direction, then the first moving image A displayed on the screen of the user terminal also moves or turns to the right, left, up, down or in the any one direction in response to the intelligent walking stick.

Since the acceleration information, slope information, and angular velocity information of the intelligent walking stick are generated by the acceleration sensor module and the angular velocity sensor module, it is preferable to move a position, direction, and angle of a part of the intelligent walking stick, and not to move the entire intelligent walking stick.

For example, assuming that the acceleration sensor module and the angular velocity sensor module are installed in the handle of the intelligent walking stick, and if the user turns the handle of the intelligent walking stick left so that the first moving image A avoids a collision with the obstacle image B that appears on a right side of the screen, then the acceleration sensor module and the angular velocity sensor generate motion information based on sensing the direction change of the intelligent walking stick, and, the motion information is transmitted to the motion information receiving part of the motion interacting application via the information receiving part of the main server and is converted to an input signal of the game content by the signal converting part. Thus, the first moving image A turns left in the same direction as the intelligent walking stick, according to the converted input signal.

The movement of the first moving image A is not limited thereto, as the first moving image A may move in a direction of right, up, or down on the screen of the user terminal as sensed by the acceleration sensor module. The first moving image A may also move on the screen of the user terminal according to a rotation direction and angle of the handle of the intelligent walking stick as sensed by the angular velocity sensor module.

In addition, the first gaming sub-content may implement various images according to a progress of the game content such as a points won image showing points gained when the first moving image A does not collide with the obstacle image B, and a points lost image showing points subtracted when the first moving image A collides with the obstacle image B, etc.

Figure 12:
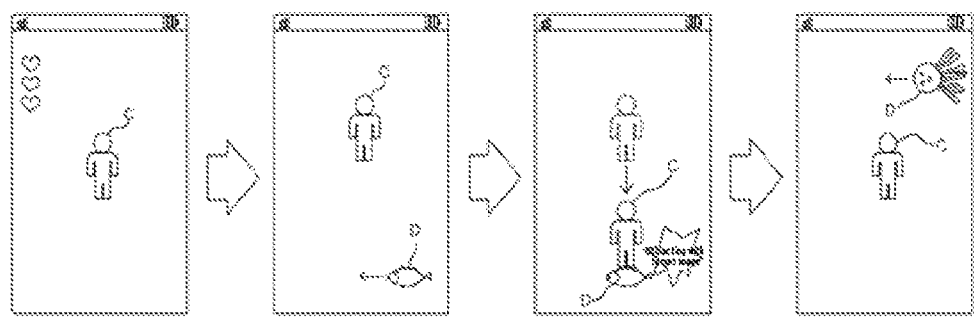
FIG. 12 is an example view of a screen in which game content of a motion interacting application is implemented in the user terminal according to an another embodiment of the present invention.

FIG. 12 is an example view of a screen in which game content of a motion interacting application is implemented in the user terminal according to another embodiment of the present invention.

The game content 511 according to the aforementioned other embodiment of the present invention further includes a second gaming sub-content 511-2 as shown in FIG. 8, and is described as follows.

The second gaming sub-content 511-2 implements a second moving image that is displayed on the screen of the user terminal and moves on the screen according to the acceleration information, the slope information, and the angular velocity information of the intelligent walking stick transmitted to the signal converting part, and a target image that is displayed on the screen at a location spaced apart from the second moving image, the target image appears at one end of the screen and is displayed on the screen for a predetermined time and then disappears at the other end of the screen, and also disappears when contacting the second moving image and then re-appears at another position on the screen.

Herein, the game content also includes game content that does not use the intelligent walking stick. However, in the present disclosure, the game content using the intelligent walking stick is described.

Referring to FIG. 12, when the second moving image C appears on the screen of the user terminal, the target object D also appears on the screen at a location spaced apart from the second moving image C. The target image D appears at one end of the screen, is displayed for a predetermined time and then disappears at the other end of the screen.

Herein, when the second gaming sub-content is executed, the second moving image C moves on the screen of the user terminal according to the acceleration information, the slope information, and the angular velocity information of the intelligent walking stick in the same manner as the first moving image A moves on the screen of the user terminal according to the acceleration information, the slope information, and the angular velocity information of the intelligent walking stick.

For example, like with the first gaming sub-content, assuming that the acceleration sensor module and the angular velocity sensor module are installed in the handle of the intelligent walking stick, and if the user moves the handle of the intelligent walking stick to a low position such that the second moving image C contacts the target image D, the target image D appearing at one end of the lower part of the screen and moving to the other end of the screen, then the acceleration sensor module and the angular velocity sensor module generate motion information by sensing the direction change of the intelligent walking stick. The motion information is transmitted to the motion information receiving part of the motion interacting application via the information receiving part of the main server and is converted to an input signal of the game content by the signal converting part. According to the converted input signal, the second moving image C moves down in a direction identical to the direction of the handle of the intelligent walking stick.

The movement of the second moving image C is not limited thereto, as the second moving image C may move on the screen of the user terminal according to a rotation direction and angle of the handle of the intelligent walking stick as sensed by the angular velocity sensor module. The second moving image C may also move in a direction of right, left, or up on the screen of the user terminal as sensed by the acceleration sensor module.

In addition, the second gaming sub-content may further implement various images according to a progress of the game content such as a points won image showing points gained whenever the target image D is made to disappear from the screen of the user terminal due to contact with the second moving image C, etc.

Thus, providing games through the game content may arouse the user's interest. Also, development of dementia may be hindered or prevented by providing mental stimulation to the user.

The invention disclosed herein has been described by means of preferred embodiments for illustrative purposes only. Furthermore, various modifications, additions and substitutions can be made thereto without departing from the spirit and scope of the invention as disclosed in the accompanying claims. Therefore, the aforementioned exemplary embodiments should be considered in a descriptive sense only and not for purposes of limitation. The scope of the present invention is outlined by the claims rather than by the detailed descriptions of the invention. The present invention is intended to cover various modifications and equivalent arrangements without departing from the spirit and scope set forth in the appended claims.

What is claimed is:

1. A safety monitoring system using an intelligent walking stick, the system comprising:
   an intelligent walking stick comprising: a motion sensing part generating motion information by sensing a motion according to a change in slope, position, and angle of the intelligent walking stick; a health sensing part generating health information by sensing a heart rate of a user; and a transmitter;
   a main server comprising: an information receiving part receiving the motion information and the health information generated from the motion sensing part and the health sensing part through the transmitter of the intelligent walking stick; an emergency notification part determining an emergency situation of the user and notifying the emergency situation to a management terminal when the motion information and the health information are not sensed while receiving the motion information and the health information from the information receiving part; and a body information storing part calculating and storing body information, the body information comprising the heart rate, a number of paces, and a number of calories burned of the user which are calculated using the motion information of the intelligent walking stick and the health information of the user transmitted from the information receiving part; and
   a user terminal comprising a motion interacting application, the motion interacting application comprising exercise content, game content, and health management content that all employ the motion information transmitted from the information receiving part or the body information transmitted from the body information storing part, the exercise content displaying the motion information on a screen of the user terminal by using the motion information as an exercise input signal when the exercise content is executed by a selection of the user, the game content displaying a specific image on the screen of the user terminal and moving the specific image by using the motion information as a game input signal when the game content is executed by a selection of the user, and the health management content always being forcibly executed and displaying the body information on one end of the screen of the user terminal.

2. The system of claim 1, wherein the intelligent walking stick further comprises a global positioning system (GPS) part installed therein and sensing current positional information of the intelligent walking stick,
   wherein the motion sensing part comprises an acceleration sensor module measuring acceleration information and slope information of the intelligent walking stick, and an angular velocity sensor module measuring angular velocity information of the intelligent walking stick, and the health sensing part comprises a heart rate sensor module measuring the heart rate of the user and a pressure sensor module measuring pressure information generated whenever a lower end of the intelligent walking stick comes into contact with a ground.

3. The system of claim 2, wherein the motion interacting application further comprises:
   a motion information receiving part that receives the acceleration information, the slope information, and the angular velocity information of the intelligent walking stick transmitted from the receiving part of the main server;
   a signal converting part that converts the acceleration information, the slope information, and the angular velocity information of the intelligent walking stick transmitted from the motion information receiving part to the exercise input signal and the game input signal; and
   an executing part that executes the game content or the exercise content by using the converted input signals of the signal converting part.

4. The system of claim 3, wherein the game content further comprises first gaming sub-content that implements:
- a first moving image that is displayed on the screen of the user terminal and moves on the screen according to the acceleration information, the slope information, and the angular velocity information of the intelligent walking stick transmitted to the signal converting part; and
- an obstacle image that is periodically displayed on the screen at a location near the first moving image for a predetermined time, and temporarily pauses a movement of the first moving image when the obstacle image comes into contact with the first moving image.

5. The system of claim 3, wherein the game content further comprises second gaming sub-content that implements:
- a second moving image that is displayed on the screen of the user terminal and moves on the screen according to the acceleration information, the slope information, and the angular velocity information of the intelligent walking stick transmitted to the signal converting part; and
- a target image that is displayed on the screen at a location spaced apart from the second moving image, the target image being made to appear at one end of the screen and displayed on the screen for a predetermined time and being made to disappear at the other end of the screen, and also being made to disappear when contacting the second moving image and then being made to re-appear at another position of the screen.

6. The system of claim 2, wherein the main server further comprises a motion state database that stores the motion information comprising the acceleration information, the slope information, and the angular velocity information of the intelligent walking stick transmitted to the information receiving part, and a health state database that stores the health information comprising the heart rate of the user and the pressure information transmitted to the information receiving part, wherein the emergency notification part generates a first emergency signal when the motion information exceeds a predetermined motion reference range, generates a second emergency signal when the health information exceeds a predetermined health reference range, and transmits the first emergency signal or the second emergency signal together with the positional information sensed by the GPS part to the management terminal after a predetermined waiting time has elapsed from when the first emergency signal or the second emergency signal is generated.

7. The system of claim 2, wherein the intelligent walking stick further comprises an emergency button that generates a third emergency signal when the emergency button is pressed, and transmits the third emergency signal and the positional information sensed by the GPS part to the main server after a predetermined waiting time has elapsed from when the third emergency signal is generated.

8. The system of claim 6, wherein the intelligent walking stick further comprises a safety confirmation button that generates a safety confirmation signal when the safety confirmation button is pressed within the predetermined waiting time, and stops generating the first emergency signal or the second emergency signal generated from the emergency notification part and stops the generation of the third emergency signal generated from the emergency button.

9. The system of claim 7, wherein the intelligent walking stick further comprises a safety confirmation button that generates a safety confirmation signal when the safety confirmation button is pressed within the predetermined waiting time, and stops generating the first emergency signal or the second emergency signal generated from the emergency notification part and stops the generation of the third emergency signal generated from the emergency button.

* * * * *